(12) United States Patent
Yan et al.

(10) Patent No.: US 11,451,652 B2
(45) Date of Patent: Sep. 20, 2022

(54) FOLDABLE DISPLAY MODULE

(71) Applicant: Wuhan China Star Optoelectronics Semiconductor Display Technology Co., Ltd., Hubei (CN)

(72) Inventors: Guochun Yan, Hubei (CN); Zhuo Zhang, Hubei (CN); Yongzhen Jia, Hubei (CN); Chunmei He, Hubei (CN); Yuan Zhao, Hubei (CN); Xiaomeng Hou, Hubei (CN)

(73) Assignee: Wuhan China Star Optoelectronics Semiconductor Display Technology Co., Ltd., Wuhan (CN)

( * ) Notice: Subject to any disclaimer, the term of this patent is extended or adjusted under 35 U.S.C. 154(b) by 118 days.

(21) Appl. No.: 16/973,450

(22) PCT Filed: Sep. 17, 2020

(86) PCT No.: PCT/CN2020/115754
§ 371 (c)(1),
(2) Date: Dec. 9, 2020

(87) PCT Pub. No.: WO2022/011823
PCT Pub. Date: Jan. 20, 2022

(65) Prior Publication Data
US 2022/0191312 A1    Jun. 16, 2022

(30) Foreign Application Priority Data
Jul. 13, 2020 (CN) .......................... 202010671175.0

(51) Int. Cl.
*B32B 7/12* (2006.01)
*H04M 1/02* (2006.01)
*B32B 27/28* (2006.01)

(52) U.S. Cl.
CPC ............. *H04M 1/0268* (2013.01); *B32B 7/12* (2013.01); *B32B 27/281* (2013.01); *H04M 1/0214* (2013.01); *B32B 2255/10* (2013.01); *B32B 2255/24* (2013.01); *B32B 2307/42* (2013.01); *B32B 2307/54* (2013.01); *B32B 2307/732* (2013.01); *B32B 2457/20* (2013.01)

(58) Field of Classification Search
CPC ..... B32B 7/12; B32B 27/281; B32B 2255/10; B32B 2307/42; B32B 2307/54; B32B 2457/20
See application file for complete search history.

(56) References Cited

U.S. PATENT DOCUMENTS

| 10,288,974 | B2 | 5/2019 | Hou et al. |
| 2014/0367644 | A1 | 12/2014 | Song et al. |
| 2017/0263889 | A1 | 9/2017 | Seki et al. |
| 2018/0177046 | A1 | 6/2018 | Wald et al. |
| 2018/0287092 | A1 | 10/2018 | Song et al. |

(Continued)

FOREIGN PATENT DOCUMENTS

| CN | 106530973 | 3/2017 |
| CN | 107710445 | 2/2018 |

(Continued)

*Primary Examiner* — Lawrence D Ferguson

(57) ABSTRACT

The present application provides a foldable display module. The foldable display module includes a flexible display panel, a first module, and a second module. The flexible display panel is disposed between the first module and the second module. A ratio of a rigidity of the first module to a rigidity of the second module ranges from 0.8 to 1.2.

15 Claims, 2 Drawing Sheets

(56) References Cited

U.S. PATENT DOCUMENTS

| | | | |
|---|---|---|---|
| 2019/0051705 A1 | 2/2019 | Breedlove et al. | |
| 2019/0312230 A1 | 10/2019 | Ochi et al. | |
| 2020/0235340 A1 | 7/2020 | Oh et al. | |
| 2021/0151699 A1 | 5/2021 | Shin | |

FOREIGN PATENT DOCUMENTS

| | | |
|---|---|---|
| CN | 108695363 | 10/2018 |
| CN | 109315034 | 2/2019 |
| CN | 109546009 | 3/2019 |
| CN | 109564985 | 4/2019 |
| CN | 109903679 | 6/2019 |
| CN | 110675755 | 1/2020 |
| CN | 110782790 | 2/2020 |
| CN | 110927834 | 3/2020 |
| CN | 111047992 | 4/2020 |
| CN | 111276629 | 6/2020 |
| JP | 2017-161621 | 9/2017 |
| KR | 10-2019-0044267 | 4/2019 |
| KR | 10-2020-0042579 | 4/2020 |

FOLDABLE DISPLAY MODULE

RELATED APPLICATIONS

This application is a National Phase of PCT Patent Application No. PCT/CN2020/115754 having International filing date of Sep. 17, 2020, which claims the benefit of priority of Chinese Patent Application No. 202010671175.0 filed on Jul. 13, 2020. The contents of the above applications are all incorporated by reference as if fully set forth herein in their entirety.

FIELD AND BACKGROUND OF THE INVENTION

The present application is related to the field of display technology, and specifically, to a foldable display module.

Currently, one of the difficulties in designs of foldable mobile phone screens is that after a foldable mobile phone is bent up to 200,000 times, its screen needs to be kept in good condition without problems such as film peeling.

Therefore, ensuring that a mobile phone does not have with problems such as film peeling after being bent multiple times is a technical problem to be solved.

SUMMARY OF THE INVENTION

A purpose of the present application is to provide a foldable display module, which can solve problems of film peeling and cracking of the flexible display panel after the foldable display module being bent multiple times.

In order to achieve the above purpose, the present application provides a foldable display module. The foldable display module includes a flexible display panel, a first module, and a second module. The flexible display panel is disposed between the first module and the second module.

The first module includes n first submodules. Each of the first submodules includes a first functional layer and a first adhesive layer. The first adhesive layer is disposed between the first functional layer and the flexible display panel. The first functional layer in an i-th first submodule includes a first elastic modulus $E_{1i}$ and a first thickness $F_{1i}$. The first adhesive layer in the i-th first submodule includes a first storage modulus $E_{3i}$ and a third thickness $H_{3i}$. n is an integer greater than or equal to 1. i is an integer greater than or equal to 1 and less than or equal to n.

The second module includes m second submodules. Each of the second submodules includes a second functional layer and a second adhesive layer. The second adhesive layer is disposed between the second functional layer and the flexible display panel. The second functional layer in a j-th second submodule includes a second elastic modulus $E_{2j}$ and a second thickness $H_{2j}$. The second adhesive layer in the j-th second submodule includes a second storage modulus $E_{4j}$ and a fourth thickness $H_{4j}$. m is an integer greater than or equal to 1. j is an integer greater than or equal to 1 and less than or equal to m.

The first elastic modulus $E_{1i}$, the first thickness $H_{1i}$, the first storage modulus $E_{3i}$, the third thickness $H_{3i}$, the second elastic modulus $E_{2j}$, the second thickness $H_{2j}$, the second storage modulus $E_{4j}$, and the fourth thickness $H_{4j}$ satisfy the following formula:

$$\sum_{1}^{n} E_{1i} \times H_{1i}^2 + \sum_{1}^{n} E_{3i} \times H_{3i}^2 = \alpha \left( \sum_{1}^{m} E_{2j} \times H_{2j}^2 + \sum_{1}^{m} E_{4j} \times H_{4j}^2 \right)$$

α represents an allowable coefficient and is greater than or equal to 0.8 and less than or equal to 1.2.

In the above foldable display module, α is greater than or equal to 0.9 and less than or equal to 1.1.

In the above foldable display module, α is equal to 1.

In the above foldable display module, a maximum allowable reference coefficient $\beta_{max}$ of an adhesive layer satisfies the following formula:

$$\beta_{max} \geq \frac{\pi}{4} \times \frac{|Ea \times Ha^2 - Eb \times Hb^2|}{Ec \times Hc^2}$$

$E_c$ and $H_c$ are respectively a storage modulus and a thickness of the adhesive layer. $E_a$ and $H_a$ are respectively an elastic modulus and a thickness of a first film layer. $E_b$ and $H_b$ are respectively an elastic modulus and a thickness of a second film layer. The adhesive layer is disposed between the first film layer and the second film layer to adhere the first film layer and the second film layer. At least one of the first adhesive layer or the second adhesive layer is the adhesive layer. The maximum allowable reference coefficient $\beta_{max}$ of the adhesive layer is proportional to a maximum allowable strain of the adhesive layer.

In the above foldable display module, the foldable display module includes a plurality of adhesive layers. Maximum allowable reference coefficients $\beta_{max}$ of the plurality of adhesive layers gradually decrease along a bending direction of the foldable display module.

In the above foldable display module, $E_c$ ranges from 10 kPa to 100 kPa, and $H_c$ ranges from 5 microns to 80 microns.

In the above foldable display module, material of the adhesive layer is selected from at least one of acrylates, acrylate derivatives, silicones, or modified silicones.

In the above foldable display module, the first module includes two first submodules. In one of the first submodules, the first functional layer is a polarizer, and the first adhesive layer is a first adhesive layer A. In the other one of the first submodules, the first functional layer is a cover plate, and the first adhesive layer is a first adhesive layer B. One of the first submodules including the polarizer is disposed between the flexible display panel and the one of the first submodules including the cover plate.

An elastic modulus of the cover plate ranges from 1 GPa to 12 GPa, and a thickness of the cover plate ranges from 40 microns to 120 microns.

A storage modulus of the first adhesive layer B ranges from 20 kPa to 100 kPa, and a thickness of the first adhesive layer B ranges from 20 microns to 80 microns.

An elastic modulus of the polarizer ranges from 1 GPa to 8 GPa, and a thickness of the polarizer ranges from 20 microns to 80 microns.

A storage modulus of the first adhesive layer A ranges from 10 kPa to 60 kPa, and a thickness of the first adhesive layer A ranges from 5 microns to 40 microns.

The second module includes one second submodule. In the second submodule, the second functional layer is a backplate support layer, and the second adhesive layer is a second adhesive layer A An elastic modulus of the backplate support layer ranges from 1 GPa to 6 GPa, and a thickness of the backplate support layer ranges from 10 microns to 40 microns.

A storage modulus of the second adhesive layer A ranges from 10 kPa to 50 kPa, and a thickness of the second adhesive layer A ranges from 8 microns to 40 microns.

In the above foldable display module, the second module further includes another one of the second submodule. One of the second submodules is disposed between the flexible display panel and the other one of the second submodules. In the other one of the second submodules, the second functional layer is a rigid support layer, and the second adhesive layer is a second adhesive layer B.

An elastic modulus of the rigid support layer is greater than 100 GPa, and a thickness of the rigid support layer ranges from 20 microns to 60 microns. A storage modulus of the second adhesive layer B ranges from 10 kPa to 40 kPa, and a thickness of the second adhesive layer B ranges from 20 microns to 80 microns.

In the above foldable display module, the elastic modulus of the cover plate ranges from 3 GPa to 10 GPa, and the thickness of the cover plate ranges from 53 microns to 120 microns.

The storage modulus of the first adhesive layer B ranges from 30 kPa to 80 kPa, and the thickness of the first adhesive layer B ranges from 40 microns to 60 microns.

The elastic modulus of the polarizer ranges from 2 GPa to 6 GPa, and the thickness of the polarizer ranges from 30 microns to 60 microns.

The storage modulus of the first adhesive layer A ranges from 20 kPa to 40 kPa, and the thickness of the first adhesive layer A ranges from 10 microns to 25 microns.

The elastic modulus of the backplate support layer ranges from 2 GPa to 5 GPa, and the thickness of the backplate support layer ranges from 18 microns to 35 microns.

The storage modulus of the second adhesive layer A ranges from 20 kPa to 40 kPa, and the thickness of the second adhesive layer A ranges from 18 microns to 35 microns.

The elastic modulus of the rigid support layer is greater than 100 GPa, and the thickness of the rigid support layer ranges from 30 microns to 50 microns.

The storage modulus of the second adhesive layer B ranges from 10 kPa to 40 kPa, and the thickness of the second adhesive layer B ranges from 30 microns to 50 microns.

In the above foldable display module, the storage modulus of the first adhesive layer B is greater than the storage modulus of the second adhesive layer B.

In the above foldable display module, a peeling strength between the second adhesive layer B and the rigid support layer is greater than 5 N/cm.

In the above foldable display module, an elongation of the second adhesive layer B is greater than 1000%.

In the above foldable display module, a peeling strength between the first adhesive layer B and at least one of the cover plate or the polarizer is greater than 3 N/cm.

In the above foldable display module, a thickness of the foldable display module ranges from 280 microns to 380 microns.

The present application provides a foldable display module. The foldable display module includes the flexible display panel, the first module, and the second module. The flexible display panel is disposed between the first module and the second module. A ratio of a rigidity of the first module to a rigidity of the second module ranges from 0.8 to 1.2, so that the flexible display panel is in a neutral layer during a bending process of the foldable display module. Because the rigidity of the first module and the rigidity of the second module are close, stresses on two opposite sides of the flexible display panel are relatively uniform, preventing the problem of film peeling during the bending process of the foldable display module.

DESCRIPTION OF SPECIFIC EMBODIMENTS OF THE INVENTION

The technical solution of the present application embodiment will be clarified and completely described with reference accompanying drawings in embodiments of the present application embodiment. Obviously, the present application described parts of embodiments instead of all of the embodiments. Based on the embodiments of the present application, other embodiments which can be obtained by a skilled in the art without creative efforts fall into the protected scope of the present application.

Figure 1:
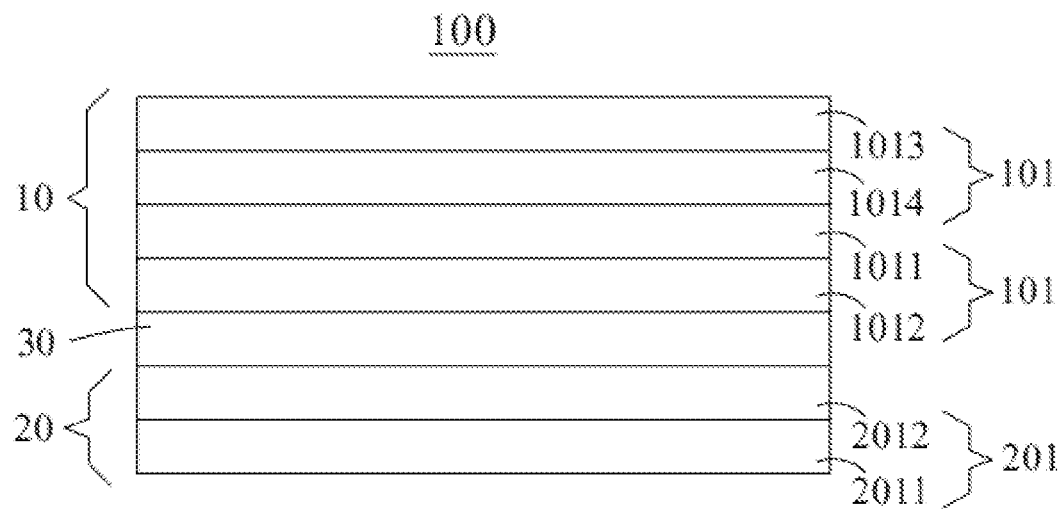
FIG. 1 is a structural schematic diagram of a foldable display module according to an embodiment of the present application.

Please refer to FIG. 1, which is a structural schematic diagram of a foldable display module according to an embodiment of the present application. The foldable display module 100 includes a flexible display panel 30, a first module 10, and a second module 20. The flexible display panel 30 is disposed between the first module 10 and the second module 20, that is, the first module 10 and the second module 20 are disposed on two opposite sides of the flexible display panel 30.

In order to increase a bending resistance of the flexible display panel 30, which means that the flexible display panel remains in a good state after being bent multiple times, the flexible display panel 30 of the present application is configured to be in a neutral layer of the foldable display module 100 during a bending process. The neutral layer means that during the bending process, the flexible display panel 30 is not subject to stress, and specifically, it is not subject to tensile stress and compressive stress. A film layer on a side of the flexible display panel is subjected to tensile stress, and a film on a side opposite to the side subjected to tensile stress is subjected to compressive stress. The flexible display panel 30 is subjected to a smallest force during the bending process, which prevents the flexible display panel from cracking due to being frequently stressed during the bending process. The flexible display panel 30 is configured to be in the neutral layer of the foldable display module 100 during the bending process by determining a ratio of a rigidity of the first module to a rigidity of the second module equal to an allowable coefficient α. The allowable coefficient α ranges from 0.8 to 1.2. Because of the allowable coefficient α ranging from 0.8 to 1.2, the first module 10 and the second module 20 on two opposite sides of the flexible display panel are subject to relatively uniform stresses during the bending process of the foldable display module 100. Therefore, this prevents the problem of film peeling from occurring inside the first module 10, inside the second module 20, between the first module 20 and the flexible display panel 30, or between the second module 20 and the flexible display panel 30.

The first module 10 includes n first submodules 101. Each of the first submodules 101 includes a first functional layer and a first adhesive layer. The first adhesive layer is disposed between the first functional layer and the flexible display panel 30. The first functional layer of each of the first submodules 101 is adhered to a side of the flexible display panel 30 through the first adhesive layer. The first functional layer in an i-th submodule 101 includes a first elastic modulus $E_{1i}$ and a first thickness $H_{1i}$. The first adhesive layer in the i-th first submodule 101 includes a first storage modulus $E_{3i}$ and a third thickness $H_{3i}$. n is an integer greater than or equal to 1. i is an integer greater than or equal to 1 and less than or equal to n. The rigidity of the first module 10 is equal to a sum of rigidities of n first functional layers and rigidities of n first adhesive layers. The first functional layer in the i-th first submodule 101 is equal to $E_{1i} \times H_{1i}^2$. The first adhesive layer in the i-th first submodule 101 is equal to $E_{3i} \times H_{3i}^2$.

The second module 20 includes m second submodules 201. Each of the second submodules 201 includes a second functional layer and a second adhesive layer. The second adhesive layer is disposed between the second functional layer and the flexible display panel 30. The second functional layer is adhered to another side of the flexible display panel 30. The second functional layer in a j-th second submodule 201 includes a second elastic modulus $E_{2j}$ and a second thickness $H_{2j}$. The second adhesive layer in the j-th second submodule 201 includes a second storage modulus $E_{4j}$ and a fourth thickness $H_{4j}$. m is an integer greater than or equal to 1. j is an integer greater than or equal to 1 and less than or equal to m. The rigidity of the second module 20 is equal to a sum of rigidities of m second functional layers and rigidities of m second adhesive layers. The second functional layer in the j-th second submodule 201 is equal to $E_{2j} \times H_{2j}^2$. The second adhesive layer in the j-th second submodule 201 is equal to $E_{4j} \times H_{4j}^2$.

When the ratio of the rigidity of the first module to the rigidity of the second module is the allowable coefficient, and the modulus and the thickness of each film layer of the first module and the modulus and the thickness of each film layer of the second module satisfy the formula:

$$\sum_1^n E_{1i} \times H_{1i}^2 + \sum_1^n E_{3i} \times H_{3i}^2 = \alpha \left( \sum_1^m E_{2j} \times H_{2j}^2 + \sum_1^m E_{4j} \times H_{4j}^2 \right),$$

the foldable display module can be bent more than 200,000 times, and still maintain a good condition, without the problems of film peeling and cracking of the flexible display panel 30. Bending methods are not limited to drop-shaped bending, U-shaped bending, or wedge-shaped bending.

Furthermore, α is greater than or equal to 0.9 and less than or equal to 1.1, so that the rigidity of the first module 10 is closer to the rigidity of the second module 20. As a result, the first module 10 and the second module 20 on two opposite sides of the flexible display panel 30 are subject to relatively uniform stresses during the bending process of the foldable display module 100, which prevents two opposite sides of the flexible display panel 30 from film peeling due to the stress particularly applying on one side.

Furthermore, when α is equal to 1, the rigidity of the first module 10 and the rigidity of the second module 20 are equal. As a result, the first module 10 and the second module 20 on two opposite sides of the flexible display panel 30 are completely subject to uniform stresses during the bending process of the foldable display module 100, which prevents two opposite sides of the flexible display panel 30 from film peeling due to the stress particularly applying on one side.

The first module 10 includes two first submodules 101. In one of the first submodules 101, the first functional layer is a polarizer 1011, and the first adhesive layer is a first adhesive layer A 1012. In the other one of the first submodules 101, the first functional layer is a cover plate 1013, and the first adhesive layer is a first adhesive layer B 1014. One of the first submodules 101 including the polarizer 1011 is disposed between the flexible display panel 30 and the one of the first submodules 101 including the cover plate 1013.

The cover plate 1013 is configured to protect the functional layer and the flexible display panel 30 under the cover plate 1013 in the foldable display module 100. Generally, the cover plate 1013 is composed of a polyimide film, and a thickness of the polyimide film ranges from 35 microns to 100 microns. In order to enhance a scratch resistance and hardness of the cover plate 1013, a hardened layer is coated on the polyimide film. The hardened layer can be an organic layer, for example, material of the organic layer is acrylate or polysiloxane. A thickness of the hardened layer ranges from 3 microns to 20 microns. The hardened layer can also be an inorganic layer, for example, material of the inorganic layer is silicon nitride or silicon oxide.

An elastic modulus of the cover plate 1013 ranges from 1 GPa to 12 GPa, or the elastic modulus of the cover plate 1013 can also range from 3 GPa to 10 GPa, for example, 4 Gpa, 6 GPa, and 8 GPa.

A thickness of the cover plate 1013 ranges from 40 microns to 120 microns, the thickness of the cover plate 1013 can also range from 53 microns to 120 microns, for example, 55 microns, 60 microns, 70 microns, and 80 microns. A thickness of the polyimide film is 50 microns. A thickness of the hardened layer is 5 microns.

A light transmittance of the cover plate 1013 is greater than 90%, a haze is less than 1%, and a yellowness is less than 2%, which makes the cover plate 1013 have an excellent optical property. A pencil hardness of the cover plate 1013 is greater than 2H, which ensures that a wear resistance of the cover plate 1013 is greater than 300 times. In addition, a surface of the cover plate 1013 is treated with anti-fingerprints to enhance an oil stain resistance of the cover plate 1013.

The first adhesive layer B 1014 is configured to adhere the cover plate 1013 and the polarizer 1011. Material of the first adhesive layer B 1014 can be any one of an optically clear adhesive (OCA), a pressure sensitive adhesive (PSA), and an ultraviolet curing adhesive. In order to ensure a foldability of the foldable display module and not block a light path of the foldable flexible display panel 30, the first adhesive layer B 1014 adopts an optical adhesive. A storage modulus of the first adhesive layer B 1014 ranges from 20 kPa to 100 kPa and can also range from 30 kPa to 80 kPa, for example, 45 kPa, 60 kPa, 70 kPa. A thickness of the first adhesive layer B 1014 ranges from 20 microns to 80 microns and can also range from 40 microns to 60 microns, for example, 30 microns and 50 microns. Material of the first adhesive layer B 1014 is selected from at least one of acrylates, acrylate derivatives, silicones, or modified silicones. Acrylate derivatives include methyl acrylate and its derivatives, ethyl acrylate and its derivatives, and butyl acrylate and its derivatives.

A peeling strength between the first adhesive layer B 1014 and at least one of the cover plate 1013 or the polarizer 1011 is greater than 3 N/cm. As a result, an interface bonding force between the first adhesive layer B 1014 and at least one of the cover plate 1013 or the polarizer 1011 is increased, and a risk of at least one of the cover plate 1013 or the polarizer 1011 being peeled off from the first adhesive layer B 1014 during the bending process is reduced. Specifically, the peeling strengths between the first adhesive layer B 1014 and the cover plate 1013 and the polarizer 1011 is greater than 3 N/cm, for example, 4 N/cm, 5 N/cm, and 8 N/cm. An appropriate adhesive composition is selected, and surfaces of the cover plate 1013 and the polarizer 1011 in contact with the first adhesive layer B 1014 are processed, for example, the surfaces of the cover plate 1013 and the polarizer 1011 in contact with the first adhesive layer B 1014 are roughened. As a result, the peeling strengths between the first adhesive layer B 1014 and the cover plate 1013 and the polarizer 1011 are greater than 5 N/cm, for example, the peeling strength between the first adhesive layer B 1014 and the cover plate 1013 is 7 N/cm, and the peeling strength between the first adhesive layer B 1014 and the polarizer 1011 is 6 N/cm.

The polarizer 1011 has a polarization function, which can increase a contrast of display of the foldable display module 100. The polarizer 1011 consists of a phase retarder, a substrate, and a protective layer. An elastic modulus of the polarizer 1011 ranges from 1 GPa to 8 GPa and can also range from 2 GPa to 6 GPa, for example, 2 GPa, 4 GPa, and 5 GPa. A thickness of the polarizer 1011 ranges from 20 microns to 80 microns and can also range from 30 microns to 60 microns, for example, 30 microns, 50 microns, and 60 microns.

The first adhesive layer A 1012 is configured to adhere the polarizer 1011 to the flexible display panel 30. Material of the first adhesive layer A 1012 is any one of the optically clear adhesive, the pressure sensitive adhesive, and the ultraviolet curing adhesive. Specifically, the material of the first adhesive layer A 1012 is the pressure sensitive adhesive. A storage modulus of the first adhesive layer A 1012 ranges from 10 kPa to 60 kPa and can also range from 20 kPa to 40 kPa, for example, 25 kPa and 30 kPa. A thickness of the first adhesive layer A 1012 ranges from 5 microns to 40 microns and can also range from 10 microns to 25 microns, for example, 15 microns, 18 microns, and 20 microns. Generally, the first adhesive layer A 1012 and the polarizer 1011 are integrated. According to actual requirements, the first adhesive layer A 1012 can also be formed between the polarizer 1011 and the flexible display panel 30 by coating. Material of the first adhesive layer A 1012 is selected from at least one of acrylates, acrylate derivatives, silicones, or modified silicones.

The second module 20 includes one second submodule 201. In the second submodule 201, the second functional layer is a backplate support layer 2011, and the second adhesive layer is a second adhesive layer A 2012.

The backplate support layer 2011 is configured to protect the flexible display panel 30 and isolate stress. The backplate support layer 2011 is a yellow polyimide film. An elastic modulus of the backplate support layer 2011 ranges from 1 GPa to 6 GPa and can also range from 2 GPa to 5 GPa, for example, 2.5 GPa, 3 GPa, and 4 GPa. A thickness of the backplate support layer 2011 ranges from 10 microns to 40 microns and can also range from 18 microns to 35 microns, for example, 20 microns, 25 microns, and 30 microns.

The second adhesive layer A 2012 is configured to adhere the backplate support layer 2011 to the flexible display panel 30. Material of the second adhesive layer A 2012 is any one of the optically clear adhesive, the pressure sensitive adhesive, and the ultraviolet curing adhesive. Specifically, the material of the second adhesive layer A 2012 is the pressure sensitive adhesive. A storage modulus of the second adhesive layer A ranges from 10 kPa to 50 kPa and can also range from 20 kPa to 40 kPa, for example, 20 kPa, 25 kPa, and 30 kPa. A thickness of the second adhesive layer A 2012 ranges from 8 microns to 40 microns and can also range from 18 microns to 35 microns, for example, 20 microns, 25 microns, and 30 microns. A peeling strength between the second adhesive layer A 2012 and a glass is greater than 2 N/cm, which ensures that the second adhesive layer A 2012 has a good interface bonding force with the flexible display panel 30 and the backplate support layer 2011, and prevents peeling from occurring between the flexible display panel 30 and the backplate support layer 2011 and the second adhesive layer A 2012. The second adhesive layer A 2012 is formed on the backplate support layer 2011 by coating. The peeling strengths between the second adhesive layer A 2012 and the glass can be 3 N/cm, 5 N/cm, and 8 N/cm. Material of the second adhesive layer A 2012 is selected from at least one of acrylates, acrylate derivatives, silicones, or modified silicones.

Figure 2:
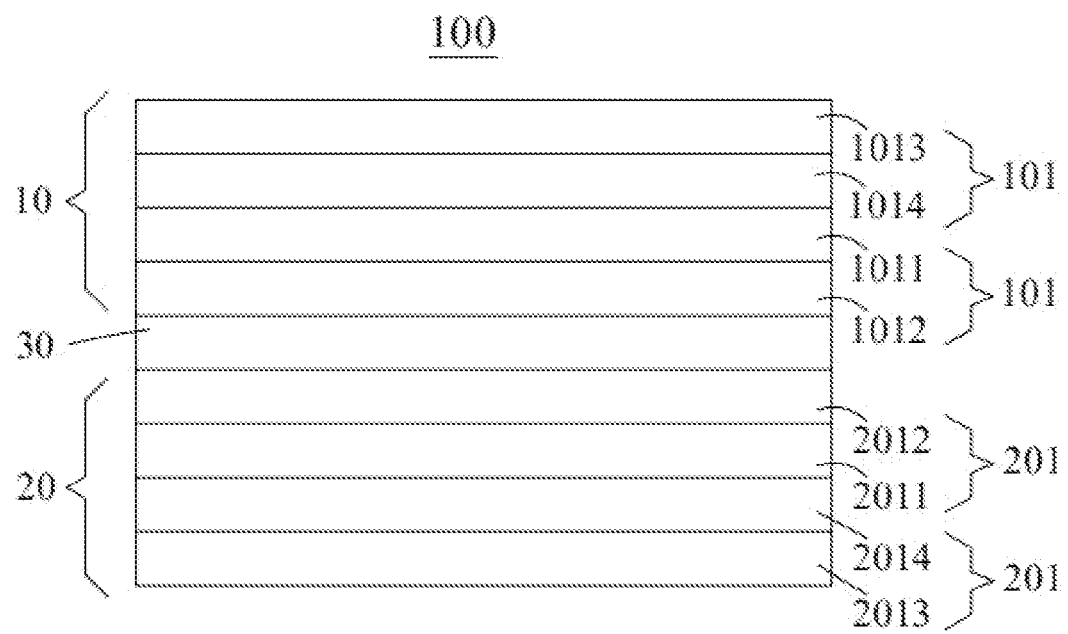
FIG. 2 is another structural schematic diagram of the foldable display module according to an embodiment of the present application.

As shown in FIG. 2, which is another structural schematic diagram of the foldable display module according to an embodiment of the present application, the second module 20 can further include another one of the second submodule 201. One of the second submodules 201 is disposed between the flexible display panel 30 and the other one of the second submodules 201. In the other one of the second submodules 201, the second functional layer is a rigid support layer 2013, and the second adhesive layer is a second adhesive layer B 2014.

The rigid support layer 2013 is configured to maintain a flatness of the foldable display module 100. The rigid support layer 2013 is a steel sheet. An elastic modulus of the rigid support layer 2013 is greater than 100 GPa, for example the elastic modulus of the rigid support layer 2013 is 100.001 GPa, 100.05 GPa, and 101 GPa. A thickness of the rigid support layer ranges from 20 microns to 60 microns and can also range from 30 microns to 50 microns, for example, 35 microns, 40 microns, and 45 microns.

The second adhesive layer B 2014 is configured to adhere the rigid support layer 2013 to the backplate support layer 2011. Material of the second adhesive layer B 2014 is any one of the optically clear adhesive, the pressure sensitive adhesive, and the ultraviolet curing adhesive. Specifically, the material of the second adhesive layer B 2014 is the optically clear adhesive. A storage modulus of the second adhesive layer B 2014 ranges from 10 kPa to 40 kPa, for example, 15 kPa, 1 8kPa, 25 kPa, and 35 kPa. A thickness of the second adhesive layer B 2014 ranges from 20 microns to 80 microns and can also range from 30 microns to 50 microns, for example, 45 microns and 50 microns. Material of the second adhesive layer B 2014 is selected from at least one of acrylates, acrylate derivatives, silicones, or modified silicones.

Because the elastic modulus of the rigid support layer 2013 is relatively large, and the storage modulus of the first adhesive layer B 1014 is greater than the storage modulus of the second adhesive layer B 2014, an overall bending performance of the flexible display module 100 is increased, and risk of interface peeling of the flexible display module 100 is reduced.

A peeling strength between the second adhesive layer B and the rigid support layer is greater than 5 N/cm, so as to increase an interface bonding force between the rigid support layer 2013 and the second adhesive layer B 2014. The rigid support layer 2013 is prevented from peeling off the second adhesive layer B 2014 during the bending process. A glass transition temperature of the second adhesive layer B 2014 ranges from −10° C. to 50° C., and an elongation of the second adhesive layer B 2014 is greater than 1000%.

In this embodiment, the flexible display panel 30 includes a thin-film transistor array layer, a light-emitting device layer, an encapsulation layer, and a touch layer, which are sequentially stacked. The light-emitting device layer includes a plurality of light-emitting diodes arranged in an array. The touch layer is formed on the encapsulation layer by an evaporation process. A thickness of the flexible display panel 30 ranges from 35 microns to 50 microns, for example, 30 microns, 35 microns, 40 microns, and 45 microns.

A thickness of the foldable display module ranges from 280 microns to 380 microns, for example, the thickness of the foldable display module is 285 microns, 300 microns, 325 microns, 340 microns, 350 microns, 360 microns, 370 microns. This not only helps the foldable display module 100 to be thinner and lighter, but also ensures that the bending performance of the foldable display module 100 is greatly increased.

Figure 3:
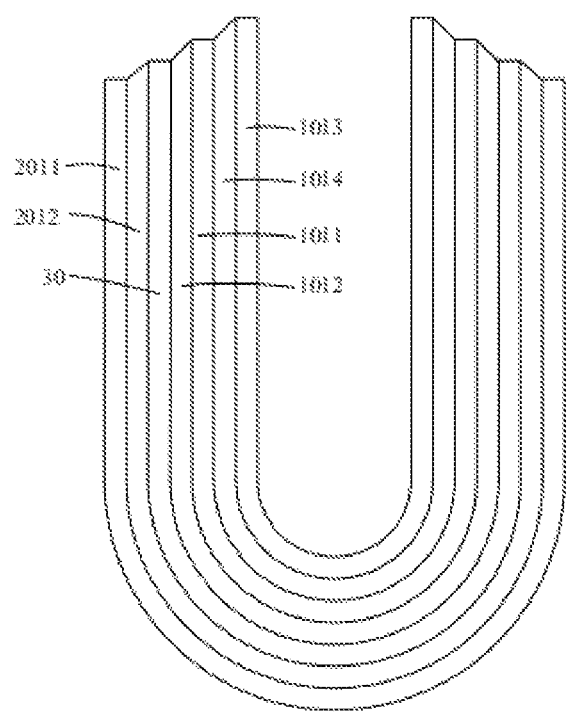
FIG. 3 is a schematic diagram of the foldable display module in FIG. 1 after being bent in a U-shape.

In addition, during the bending process of the foldable display module, the first functional layer, the second functional layer, and the flexible display panel 30 are rigid materials relative to the first adhesive layer and the second adhesive layer. The first functional layer, the second functional layer, and the flexible display panel 30 are not easily deformed during the bending process, and the first adhesive layer and the second adhesive layer as the adhesive layer have dislocations during the bending process, as shown in FIG. 3, which is a schematic diagram of the foldable display module in FIG. 1 after being bent in a U-shape. In order to prevent that an actual deformation of the adhesive layers during the bending process from being greater than a maximum dislocation deformation they can bear, the present application makes a maximum allowable reference coefficient $\beta_{max}$ of an adhesive layer satisfy the following formula:

$$\beta_{max} \geq \frac{\pi}{4} \times \frac{|Ea \times Ha^2 - Eb \times Hb^2|}{Ec \times Hc^2}.$$

$E_c$ and $H_c$ are respectively a storage modulus and a thickness of the adhesive layer. $E_a$ and $H_a$ are respectively an elastic modulus and a thickness of a first film layer. $E_b$ and $H_b$ are respectively an elastic modulus and a thickness of a second film layer. The adhesive layer is disposed between the first film layer and the second film layer to adhere the first film layer and the second film layer. At least one of the first adhesive layer or the second adhesive layer is the adhesive layer. The maximum allowable reference coefficient $\beta_{max}$ of the adhesive layer is proportional to a maximum allowable strain of the adhesive layer.

According to the elastic modulus and the thickness of film layers in contact with top and bottom of the adhesive layer and the storage modulus and the thickness of the adhesive layer itself in the above formula, a minimum value of the maximum allowable reference coefficient max of the adhesive layer, which ensures that the bending performance of the foldable display module, can be obtained. The bending performance of the adhesive layer in the foldable display module is increased during the bending process, and the flexible display panel is in the neutral layer of the foldable display module, so that the bending performance of the foldable display module is significantly increased.

The maximum allowable strain of the adhesive layer is related to a material selection of the adhesive layer. An actual strain of the adhesive layer is produced by rigidities of the film layers on both sides during the bending process of the adhesive layer. Whether the maximum allowable reference coefficient max corresponding to the maximum allowable strain of the adhesive layer satisfies requirements is determined by a relationship between the maximum allowable strain of the selected adhesive layer and the actual strain.

When the foldable display module includes a plurality of adhesive layers, maximum allowable reference coefficients $\beta_{max}$ of the plurality of adhesive layers gradually decrease along a bending direction of the foldable display module, so as to adapt to decreasing deformations of the adhesive layers along the bending direction of the foldable display module. For example, when the foldable display module is an inward folding display module, the maximum allowable reference coefficients $\beta_{max}$ of the second adhesive layer B 2014, the second adhesive layer A 2012, the first adhesive layer A 1012, and the first adhesive layer B 1014 are decreased.

$E_c$ ranges from 10 kPa to 100 kPa, for example, 15 kPa, 20 kPa, 30 kPa, 50 kPa, and 60 kPa. $H_c$ ranges from 5 microns to 80 microns, for example, 8 microns, 15 microns, 20 microns, 30 microns, 40 microns, and 60 microns.

The above solutions are described with reference to the structures of the foldable display module shown in FIGS. 1 and 2 with embodiments and a comparative example.

| | | First embodiment | | Second embodiment | | Third embodiment | | Fourth embodiment | | Comparative example | |
|---|---|---|---|---|---|---|---|---|---|---|---|
| | | Thickness (μm) | Elastic/storage modulus (MPa) | Thickness (μm) | Elastic/storage modulus (MPa) | Thickness (μm) | Elastic/storage modulus (MPa) | Thickness (μm) | Elastic/storage modulus (MPa) | Thickness (μm) | Elastic/storage modulus (MPa) |
| First module | | | | | | | | | | | |
| Cover plate | Hardened layer | 20 | 3400 | 3 | 8000 | 20 | 10000 | 10 | 1000 | 20 | 10000 |
| | polyimide | 100 | | 57 | | 100 | | 50 | | 100 | |
| First adhesive layer B | | 60 | 0.03 | 20 | 0.08 | 50 | 0.05 | 80 | 0.08 | 50 | 0.05 |
| Polarizer | | 20 | 1000 | 80 | 8000 | 55 | 6000 | 50 | 1000 | 55 | 6000 |
| First adhesive layer A | | 40 | 0.01 | 5 | 0.06 | 15 | 0.03 | 25 | 0.06 | 15 | 0.03 |
| Second module | | | | | | | | | | | |
| Second adhesive layer A | | 15 | 0.02 | 40 | 0.05 | 20 | 0.03 | 35 | 0.05 | 20 | 0.03 |
| Backplate support layer | | 15 | 6000 | 40 | 1000 | 20 | 3000 | 35 | 5000 | 20 | 3000 |

-continued

|  | First embodiment | | Second embodiment | | Third embodiment | | Fourth embodiment | | Comparative example | |
| --- | --- | --- | --- | --- | --- | --- | --- | --- | --- | --- |
|  | Thickness (μm) | Elastic/ storage modulus (MPa) | Thickness (μm) | Elastic/ storage modulus (MPa) | Thickness (μm) | Elastic/ storage modulus (MPa) | Thickness (μm) | Elastic/ storage modulus (MPa) | Thickness (μm) | Elastic/ storage modulus (MPa) |
| Second adhesive layer B | 40 | 0.01 | 80 | 0.04 | 60 | 0.03 | 0 | 0 | 60 | 0.03 |
| Rigid support layer | 20 | 100050 | 30 | 108000 | 40 | 100001 | 0 | 0 | 30 | 100001 |
| α value | | 1.19 | | 0.81 | | 1 | | 1 | | 0.65 |
| Overall thickness | | 330 | | 355 | | 380 | | 285 | | 370 |
| Test 2000,000 bends | | Pass | | Pass | | Pass | | Pass | | Fail |
| Film peeling | | No | | No | | No | | No | | No |

A method of 200,000 times bending test: folding the foldable display module shown in FIG. 1 from an unfolded state to a U-shaped folded state shown in FIG. 3 by 200,000 times.

Fifth Embodiment

This embodiment aims to investigate an influence of a thickness change of the second adhesive layer A on the bending performance of the foldable display module. In this embodiment, with the exception that the thickness of the second adhesive layer A is different from that of the third embodiment, the others are same as the third embodiment. The thickness of the second adhesive layer A ranges from 8 microns to 14 microns, from 14 microns to 20 microns, from 20 microns to 26 microns, and from 26 microns to 32 microns as variables. The results of simulating deformations of the first adhesive layer A, the first adhesive layer B, the second adhesive layer A, and the second adhesive layer B in bending tests are shown in the following table.

|  | 8 microns to 14 microns | 14 microns to 20 microns | 20 microns to 26 microns | 26 microns to 32 microns |
| --- | --- | --- | --- | --- |
| First adhesive layer A | 280% | 280% | 280% | 280% |
| First adhesive layer B | 370% | 370% | 370% | 370% |
| Second adhesive layer A | 370% | 340% | 310% | 270% |
| Second adhesive layer B | 300% | 275% | 270% | 265% |

It can be known from the above table, with the thickness of the second adhesive layer A increasing from the range of 8 microns to 14 microns to the range of 26 microns to 32 microns, the deformations of the first adhesive layer A and the second adhesive layer B are not affected, meanwhile, the deformation of the second adhesive layer A is significantly decreased, and the deformation of the second adhesive layer B is gradually decreased. Therefore, an increase in the thickness of the second adhesive layer A can reduce the risk of peeling between the adhesive layer and the functional layer in the second module, so that the overall bending performance of the foldable display module is significantly increased.

Sixth Embodiment

This embodiment aims to calculate the maximum allowable reference coefficient $\beta_{max1}$ of the first adhesive layer B in the first embodiment, and calculate the maximum allowable reference coefficient $\beta_{max2}$ of the second adhesive layer B.

$\beta_{max1} \geq 352989$ $\beta_{max2} \geq 1897247$

Combining a difference between a rigidity of the cover plate and a rigidity of the polarizer and the rigidity of the first adhesive layer B calculated from an actually selected elastic modulus and the thickness of the first adhesive layer B, a minimum value of the maximum allowable reference coefficient of the first adhesive layer B can be calculated. An actually selected first adhesive layer B is affected by the rigidity of the cover plate and the rigidity of the polarizer on two opposite sides of the first adhesive layer B, which corresponds to a fixed actual strain after bending. Because the actual strain is related to the rigidity, whether the maximum allowable reference coefficient related to rigidity satisfies the requirements is determined by comparing the maximum allowable strain and the actual strain, so as to determine whether the elastic modulus and the thickness of the first adhesive layer B satisfy the requirements. The elastic modulus and the thickness of the second adhesive layer B are selected in a same way and are not described in detail herein.

The description of embodiments above is only for helping to understand technical solutions of the present application and its core idea. Understandably, for a person of ordinary skill in the art can make various modifications of the technical solutions of the embodiments of the present application above. However, it does not depart from the scope of the technical solutions of the embodiments of the present application.

What is claimed is:

1. A foldable display module, comprising a flexible display panel, a first module, and a second module;
wherein the flexible display panel is disposed between the first module and the second module;
wherein the first module comprises n first submodules, each of the first submodules comprises a first functional layer and a first adhesive layer, the first adhesive layer is disposed between the first functional layer and the flexible display panel, the first functional layer in an i-th first submodule comprises a first elastic modulus $E_{1i}$ and a first thickness $H_{1i}$, the first adhesive layer in the i-th first submodule comprises a first storage modulus $E_{3i}$ and a third thickness $H_{3i}$, n is an integer greater than or equal to 1, and i is an integer greater than or equal to 1 and less than or equal to n;

wherein the second module comprises m second submodules, each of the second submodules comprises a second functional layer and a second adhesive layer, the second adhesive layer is disposed between the second functional layer and the flexible display panel, the second functional layer in a j-th second submodule comprises a second elastic modulus $E_{2j}$ and a second thickness $H_{2j}$, the second adhesive layer in the j-th second submodule comprises a second storage modulus $E_{4j}$ and a fourth thickness $H_{4j}$, m is an integer greater than or equal to 1, and j is an integer greater than or equal to 1 and less than or equal to m; and wherein the first elastic modulus $E_{1i}$, the first thickness $H_{1i}$, the first storage modulus $E_{3i}$, the third thickness $H_{3i}$, the second elastic modulus $E_{2j}$, the second thickness $H_{2j}$, the second storage modulus $E_{4j}$, and the fourth thickness $H_{4j}$ satisfy the following formula:

$$\sum_{1}^{n} E_{1i} \times H_{1i}^2 + \sum_{1}^{n} E_{3i} \times H_{3i}^2 = \alpha \left( \sum_{1}^{m} E_{2j} \times H_{2j}^2 + \sum_{1}^{m} E_{4j} \times H_{4j}^2 \right),$$

and

α represents an allowable coefficient and is greater than or equal to 0.8 and less than or equal to 1.2.

2. The foldable display module according to claim 1, wherein α is greater than or equal to 0.9 and less than or equal to 1.1.

3. The foldable display module according to claim 1, wherein α is equal to 1.

4. The foldable display module according to claim 1, wherein a maximum allowable reference coefficient $\beta_{max}$ of an adhesive layer satisfies the following formula:

$$\beta_{max} \geq \frac{\pi}{4} \times \frac{|Ea \times Ha^2 - Eb \times Hb^2|}{Ec \times Hc^2};$$

$E_c$ and $H_c$ are respectively a storage modulus and a thickness of the adhesive layer, $E_a$ and $H_a$ are respectively an elastic modulus and a thickness of a first film layer, and $E_b$ and $H_b$ are respectively an elastic modulus and a thickness of a second film layer;

the adhesive layer is disposed between the first film layer and the second film layer to adhere the first film layer and the second film layer;

at least one of the first adhesive layer or the second adhesive layer is the adhesive layer; and the maximum allowable reference coefficient $\beta_{max}$ of the adhesive layer is proportional to a maximum allowable strain of the adhesive layer.

5. The foldable display module according to claim 4, further comprising a plurality of adhesive layers;

wherein maximum allowable reference coefficients $\beta_{max}$ of the plurality of adhesive layers gradually decrease along a bending direction of the foldable display module.

6. The foldable display module according to claim 4, wherein $E_c$ ranges from 10 kPa to 100 kPa, and $H_c$ ranges from 5 microns to 80 microns.

7. The foldable display module according to claim 4, wherein material of the adhesive layer is selected from at least one of acrylates, acrylate derivatives, silicones, or modified silicones.

8. The foldable display module according to claim 1, wherein the first module comprises two first submodules;

in one of the first submodules, the first functional layer is a polarizer, and the first adhesive layer is a first adhesive layer A;

in the other one of the first submodules, the first functional layer is a cover plate, and the first adhesive layer is a first adhesive layer B;

one of the first submodules comprising the polarizer is disposed between the flexible display panel and the one of the first submodules comprising the cover plate;

an elastic modulus of the cover plate ranges from 1 GPa to 12 GPa, and a thickness of the cover plate ranges from 40 microns to 120 microns;

a storage modulus of the first adhesive layer B ranges from 20 kPa to 100 kPa, and a thickness of the first adhesive layer B ranges from 20 microns to 80 microns;

an elastic modulus of the polarizer ranges from 1 GPa to 8 GPa, and a thickness of the polarizer ranges from 20 microns to 80 microns;

a storage modulus of the first adhesive layer A ranges from 10 kPa to 60 kPa, and a thickness of the first adhesive layer A ranges from 5 microns to 40 microns;

the second module comprises one second submodule;

in the second submodule, the second functional layer is a backplate support layer, and the second adhesive layer is a second adhesive layer A;

an elastic modulus of the backplate support layer ranges from 1 GPa to 6 GPa, and a thickness of the backplate support layer ranges from 10 microns to 40 microns; and a storage modulus of the second adhesive layer A ranges from 10 kPa to 50 kPa, and a thickness of the second adhesive layer A ranges from 8 microns to 40 microns.

9. The foldable display module according to claim 8, wherein the second module further comprises another one of the second submodule;

one of the second submodules is disposed between the flexible display panel and the other one of the second submodules;

in the other one of the second submodules, the second functional layer is a rigid support layer, and the second adhesive layer is a second adhesive layer B;

an elastic modulus of the rigid support layer is greater than 100 GPa, and a thickness of the rigid support layer ranges from 20 microns to 60 microns; and a storage modulus of the second adhesive layer B ranges from 10 kPa to 40 kPa, and a thickness of the second adhesive layer B ranges from 20 microns to 80 microns.

10. The foldable display module according to claim 9, wherein the elastic modulus of the cover plate ranges from 3 GPa to 10 GPa, and the thickness of the cover plate ranges from 53 microns to 120 microns;

the storage modulus of the first adhesive layer B ranges from 30 kPa to 80 kPa, and the thickness of the first adhesive layer B ranges from 40 microns to 60 microns;

the elastic modulus of the polarizer ranges from 2 GPa to 6 GPa, and the thickness of the polarizer ranges from 30 microns to 60 microns;

the storage modulus of the first adhesive layer A ranges from 20 kPa to 40 kPa, and the thickness of the first adhesive layer A ranges from 10 microns to 25 microns;

the elastic modulus of the backplate support layer ranges from 2 GPa to 5 GPa, and the thickness of the backplate support layer ranges from 18 microns to 35 microns;

the storage modulus of the second adhesive layer A ranges from 20 kPa to 40 kPa, and the thickness of the second adhesive layer A ranges from 18 microns to 35 microns;

the elastic modulus of the rigid support layer is greater than 100 GPa, and the thickness of the rigid support layer ranges from 30 microns to 50 microns; and the storage modulus of the second adhesive layer B ranges from 10 kPa to 40 kPa, and the thickness of the second adhesive layer B ranges from 30 microns to 50 microns.

11. The foldable display module according to claim 9, wherein the storage modulus of the first adhesive layer B is greater than the storage modulus of the second adhesive layer B.

12. The foldable display module according to claim 9, wherein a peeling strength between the second adhesive layer B and the rigid support layer is greater than 5 N/cm.

13. The foldable display module according to claim 9, wherein an elongation of the second adhesive layer B is greater than 1000%.

14. The foldable display module according to claim 8, wherein a peeling strength between the first adhesive layer B and at least one of the cover plate or the polarizer is greater than 3 N/cm.

15. The foldable display module according to claim 1, wherein a thickness of the foldable display module ranges from 280 microns to 380 microns.

\* \* \* \* \*